United States Patent
Rackley et al.

[11] Patent Number: 5,872,556
[45] Date of Patent: Feb. 16, 1999

[54] RAM BASED YUV-RGB CONVERSION

[75] Inventors: Darwin Preston Rackley, Boca Raton, Fla.; Roderick Michael Peters West, Colchester, Vt.

[73] Assignee: International Business Machines Corp., Armonk, N.Y.

[21] Appl. No.: 43,320

[22] Filed: Apr. 6, 1993

[51] Int. Cl.$^6$ .................................................. G09G 5/04
[52] U.S. Cl. ........................................ 345/154; 345/199
[58] Field of Search ................................... 345/153, 154, 345/155, 186, 199; 358/518, 519

[56] References Cited

U.S. PATENT DOCUMENTS

| | | |
|---|---|---|
| 4,597,005 | 6/1986 | Baleshta et al. . |
| 4,598,282 | 7/1986 | Pugsley .................................... 345/154 |
| 4,789,854 | 12/1988 | Ishii ........................................ 345/154 |
| 5,081,450 | 1/1992 | Lucas et al. ............................. 345/155 |
| 5,124,688 | 6/1992 | Rumball .................................. 345/154 |

FOREIGN PATENT DOCUMENTS

| | | | |
|---|---|---|---|
| 0130594 | 5/1990 | Japan . | |
| WO-A-9307720 | 4/1993 | WIPO ............................ H04N 11/04 |

Primary Examiner—Chanh Nguyen
Attorney, Agent, or Firm—Robert Lieber

[57] ABSTRACT

Encoded color image data, stored in a first format such as YUV or YIQ, is converted to RGB format for output to a color display system. The conversion is carried out in real time synchronism with generation of the display, in order to minimize buffer storage requirements for the RGB output data. Present circuits use RAM (random access memory) storage arrays lookup tables for product functions defined in associated conversion equations. Each product function is a product of multiplication of a predetermined constant and data representing a U or V component of a source image pixel. Use of these tables effectively speeds up the conversion process, and has the added advantage of flexibility since the respective data is changeable to adjust to various image and display formats and conditions. In one embodiment, a RAM array used in the present format conversion process is also used (in a different display mode, with different stored data) as a conventional source of palette data. In the present conversion process, a cascaded network of adders receives product functions read out of one or more lookup table RAM arrays, adds certain of these functions together, and adds data representing Y components corresponding to the lookup table U and V arguments, to produce final output data representing red, green and blue (RGB) attributes of an instantly displayable pixel corresponding to a source pixel associated with respective source YUV components.

14 Claims, 5 Drawing Sheets

RAM BASED YUV-RGB CONVERSION

FIELD OF THE INVENTION

This invention relates to conversion of color image data, from YUV or YIQ format to RGB format, in real time coordination with display raster timing of computer display monitors which display image data in RGB format.

BACKGROUND OF THE INVENTION

Color images displayed on contemporary computer display monitors include so-called "inatural images" of the type produced e.g. by color photography. Encoded data representing elements of such images (e.g. pixels) is often stored in computer systems in "YUV" or "YIQ" format. In YUV format, the code representing an image element defines three attributes of the respective element; a luminance factor (Y) and two color factors: red minus Y (U), and red minus blue (V). YIQ encoding is similar to YUV, but contains I and Q element components that align axially with natural images.

In order to display such data on conventional color monitors used in computers and workstations, data representing individual elements of the source (YUV or YIQ) image must be converted to an RGB format which defines relative red, green and blue luminance attributes (RGB) of directly displayable elements of a corresponding image. Such conversions generally have to be performed in real time coordination with operations of the display monitor, so that the RGB image elements are displayed as they are generated, thereby minimizing buffer storage requirements for the data representing these elements. In a typical YUV to RGB conversion, matrix multiplications are performed on color components of the source data (U and V), and results are logically added to respective luminance components (Y) to produce corresponding RGB data components. These operations effectively form three sums of products yielding functions representing red, green and blue components of an RGB image pixel, in which the product terms are formed by multiplying U and V components of each corresponding source pixel by various predetermined constants and in which the corresponding Y component of each source pixel is a separate added term in each sum.

To achieve speeds required to meet display raster constraints, these multiplication and addition functions usually are performed in a hardwired cascaded adder structure containing a number of adder stages linearly related to the number of 1 valued bits in the fractional parts of the multiplicative constants. This type of arrangement can be constructed efficiently if the values of the constants can be chosen to minimize the number of adder stages required. However, it has the disadvantage that only a single set of constants is effectively "wired" into any implementation, allowing no flexibility for adjusting the constants to accommodate variations in image conditions or display parameters. Furthermore, in many instances, the multiplicative constants cannot be chosen to minimize adder stages.

Therefore, in applications in which multiplicative constants need to be changed from time to time, or where they cannot be chosen to optimize a cascaded adder network, adder network structures hitherto used are either too inflexible or subject to excessive pipelining delays which cannot be tolerated.

The present invention provides an alternative arrangement for performing such conversions more flexibly and generally faster than other known arrangements.

OBJECTS OF THE INVENTION

An object of the invention is to provide a more efficient arrangement for converting data representing encoded color image elements from a first format to a second format, where the first format is one that is not directly displayable on conventional computer display monitors and the second format is directly displayable on such monitors.

Another object is to provide a more efficient arrangement for converting a natural color image represented in a YUV or YIQ code format into a corresponding color image represented in a directly displayable RGB format, wherein conversions of individual elements of source natural images are carried out in coordination with real time generation of displays of respective images, so that minimum buffer storage is required for the RGB data resulting from the conversion.

Another object is to provide an efficiently organized color image display system, for use with conventional computer color display monitors, wherein image data encoded in a first format that is not directly displayable on such monitors is converted to data signals encoded in a second format that is directly displayable, and wherein conversions from the first format to the second format are carried out in real time coordination with generation of respective image displays so that minimum buffer storage is needed for signals in the second format.

Another object is to provide an efficiently organized color image display system, for use with conventional computer display color monitors, wherein encoded data in a YUV format, representing natural color images, is converted on the fly into corresponding RGB data that is instantly displayable as it is generated.

A related object is to provide a display system as characterized in the previous paragraph, wherein: the format conversion sums the Y components of YUV source data with sums of products in which U and V components of the source data and predetermined constants are factors; the constant factors have fractional portions containing at least N 1-valued bits; the multiplications are effected by table lookup functions performed relative to one or more lookup tables stored in one or more RAM (Random Access Memory) units, and the sums of the product terms and the Y component are generated in a cascaded adder structure containing M discrete adder stages; wherein M and N are non-zero integers and M is less than N.

SUMMARY OF THE INVENTION

Two embodiments of the invention are disclosed herein. Both contain pipelined logic for YUV to RGB conversion. Each contains one or more RAM units containing programmably changeable data. The RAM units are serially coupled to a cascaded network of adders and latches. Together, the RAM units and adder/latch network perform matrix multiplications of the type alluded to in the last object above.

A first (presented) embodiment uses a single RAM dedicated for multipurpose display usage. The RAM is programmed to serve either as a conventional source of color "palette" information, or as a lookup table for YUV-RGB conversion. In YUV-RGB usage mode, data associated with YUV-RGB conversion, which is pre-stored in the RAM by a suitable application or device driver, is read out of the RAM and applied to a network of cascaded adders and latches. Outputs of the adder/latch network are transferred through a multiplexer switch to a display monitor. In palette usage mode, conventional palette data pre-stored in the RAM (by an application driver associated with this mode), is read out of the RAM and applied directly to the monitor through the multiplexer switch just mentioned.

This embodiment features use of a single RAM to convert YUV data derived by "chrominance sub-sampling"

(reference e.g. 1) VIDEO DATA HANDBOOK, 1991, Signetics Philips Semiconductors, pages 2–29 thru 2–35; 2)IMAGE COMPRESSION: THE EMERGING STANDARD FOR COLOR IMAGES, A. C. Hung, Stanford U., Computing Futures, 1989 IEEE). In such data, luminance of individual pixels is represented by discrete Y components, and chrominance of pairs of consecutive pixels is represented by a single U and V component for each pair. In accordance with the invention, U and V components of data representing each pair of consecutive pixels, are applied in consecutive cycles to a lookup table contained in a single RAM unit.

Data in the table, which represents multiplicative products of respective U and V components with predetermined constants, is read out of the RAM, at locations defined by respective U and V components, and applied to a cascaded network of adders and latches. The adder/latch network forms sums of Y source data (representing luminance of source image pixels associated with the respective U and V components) with output data furnished by the RAM, to develop results representing instantly displayable components of corresponding pixels in an RGB format. Data fed from the RAM to the adder/latch network is variously right-shifted, in order to divide respective terms by various powers of 2 satisfying associated conversion equations.

In this same (first) embodiment, the RAM used to store the lookup table is used in a Palette translation display mode (a mode different from the one sustaining YUV-RGB conversions) to store a different form of data associated with palette indexing. To prepare for each mode, the RAM is pre-filled with programmed data specifically required for that mode. In the YUV-RGB conversion mode, data stored in the RAM corresponds to the product terms characterized above, and in palette mode the stored data is palette information unrelated to YUV conversion.

However, the use of a single RAM in the YUV-RGB conversion process as characterized above is considered novel per se, irrespective of whether the same RAM is used for other purposes.

The other/second embodiment converts YUV source data that has been derived by a process which either does not involve chrominance sub-sampling or in which effects of chrominance sub-sampling have been removed. In such conversions, U and V components of YUV data representing single image elements are used to address one or more pairs of RAM's, in which each RAM of the pair contains a conversion lookup table of multiplicative products of the respective source component by predetermined constants. Product terms read out of the RAM pair or pairs are applied in parallel to a network of cascaded adders. The adder network forms sums of the product terms with the respective Y source data to produce result data directly representing RGB attributes of an instantly displayable pixel. In this embodiment, the adder network does not require latching stages because products associated with corresponding U and V terms are produced simultaneously.

A variation of the second embodiment allows for shared use of respective RAM's to store either YUV-RGB data, for supporting a corresponding display conversion mode, or palette emulation data for supporting a palette emulation mode.

These and other objects, features, advantages and benefits of the invention will be more fully understood and appreciated from the following description and claims.

DETAILED DESCRIPTION OF PREFERRED EMBODIMENTS

1. System Environment

Figure 1:
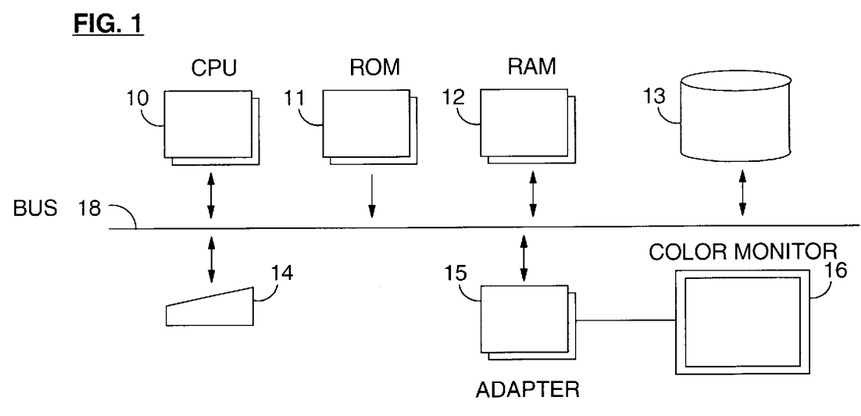
FIG. 1 schematically illustrates a conventional computer color display system environment in which the present invention can be advantageously applied.

FIG. 1 shows a typical computer and display system to which the subject invention is applicable.

The system contains a central processing unit (CPU) 10, a storage subsystem comprising (as typical elements) a read only memory (ROM) 11 and a read/writable random access memory (RAM) 12, a disk storage subsystem 13, a keyboard 14, and a display subsystem comprising a display adapter 15 and color monitor 16. In its application to this type of system environment, the present invention is contained predominantly in a display adapter (or adapters), although the source YUV data to be converted may be stored in the storage subsystem of the system. In general, however, the display adapter would usually have its own RAM storage with sufficient capacity to store data of at least one YUV image.

2. Problem to Which Invention is Directed

The invention solves the problem of providing for a programmably flexible, yet fast, conversion of color image data, from a format associated typically with "natural images" or pictures, such as a YUV format, to an RGB format that is instantly displayable on any computer color monitor.

As noted earlier, the prior approach—in which the conversion is performed entirely in a cascaded network of logical adders—is insufficiently flexible and too complex and cumbersome for many applications. The required conversion is accomplished presently by performing multiplications of source data by constants in one or more dedicated RAM lookup tables. In these multiplications, source data representing U and V components of a source image pixel are multiplied by various constants. The Y components of each source pixel are added to data extracted from the lookup table(s) for corresponding U and V components in a cascaded adder network. The number of adder stages in this network is small by comparison to the number of stages which would be required to perform the entire conversion function.

Accordingly, the present technique, performs such conversions efficiently, and has added advantages of flexibility since the table lookap data written into the lookup RAM(s)

can be varied to adjust for a variety of factors in the source image and the display.

Figure 2:
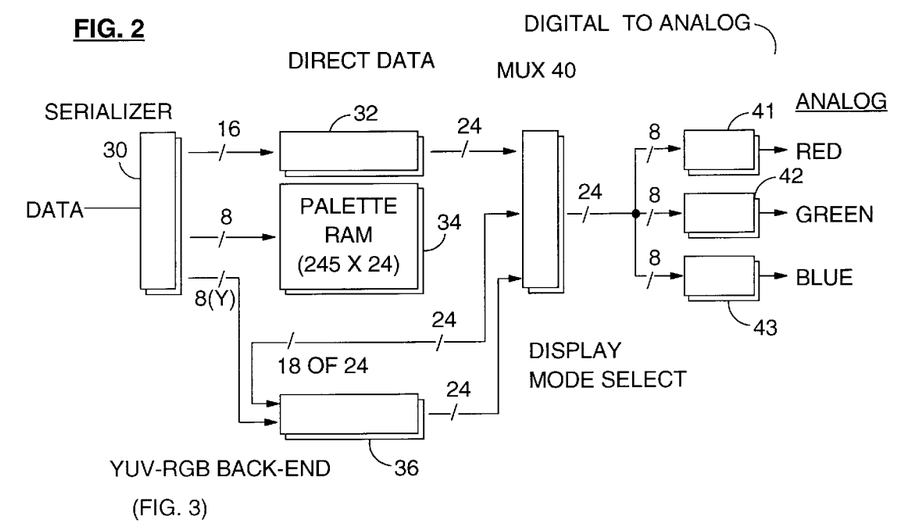
FIG. 2 schematically shows a first embodiment of the invention, which allows a conventional palette RAM to be shared for use in a YUV-RGB conversion process.
Figure 3:
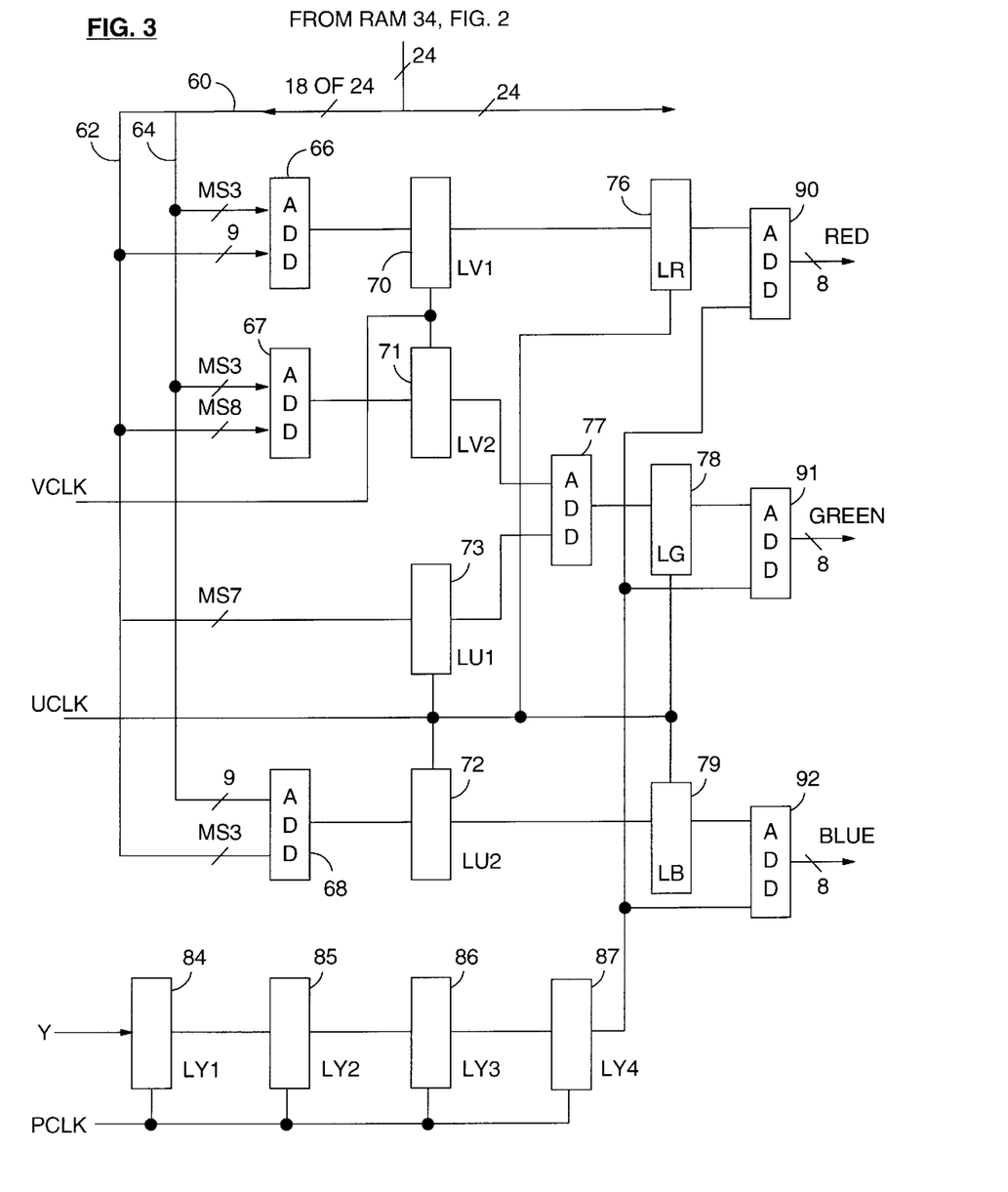
FIG. 3 schematically illustrates the structure of "backend" conversion logic shown as a single block in FIG. 2.
Figure 4:
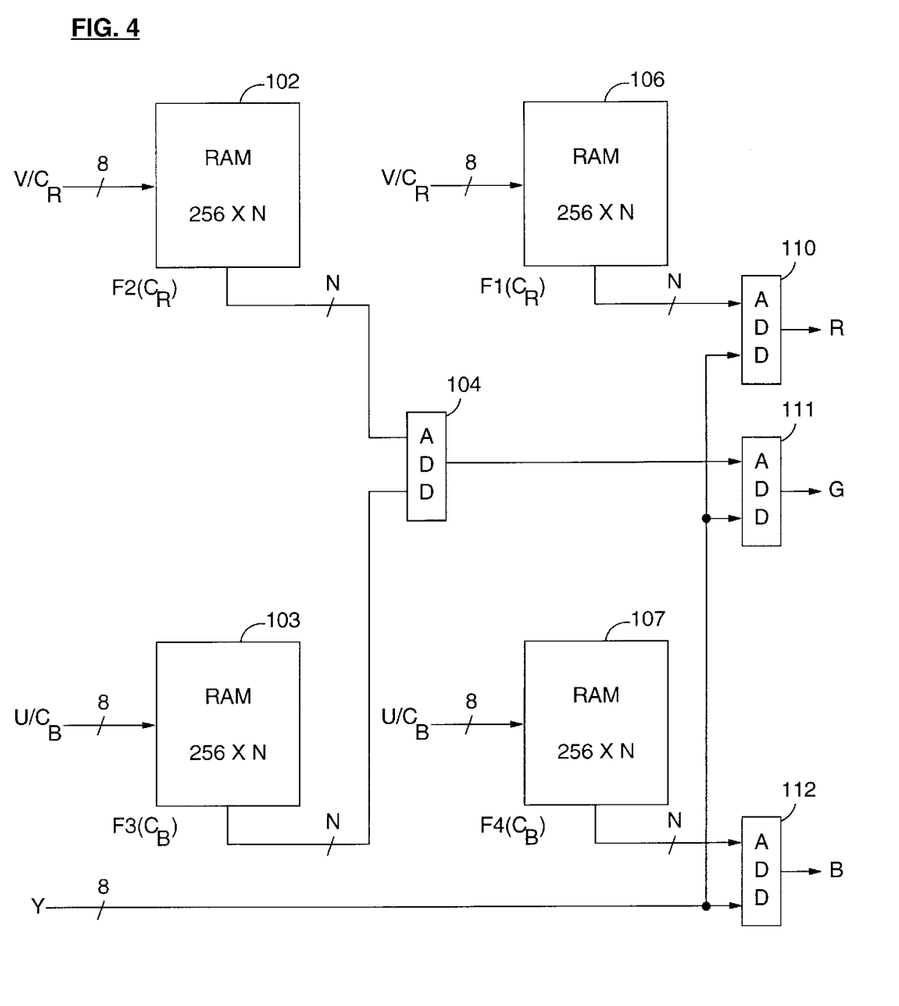
FIGS. 4 and 5 schematically illustrate variations of a second embodiment of the invention, in which outputs of one or more pairs of RAM units dedicated for YUV-RGB conversion usage are coupled to an associated cascaded adder network dedicated to the same usage. The RAM pairs and network cooperate in a pipeline to convert source YUV data representing discrete elements of a natural image or picture into RGB data representing corresponding discrete elements of a displayable image. The arrangement of FIG. 5 contains fewer RAM pairs than that of FIG. 4, but the RAM units in FIG. 5 are twice as wide as those in FIG. 4.
Figure 5:
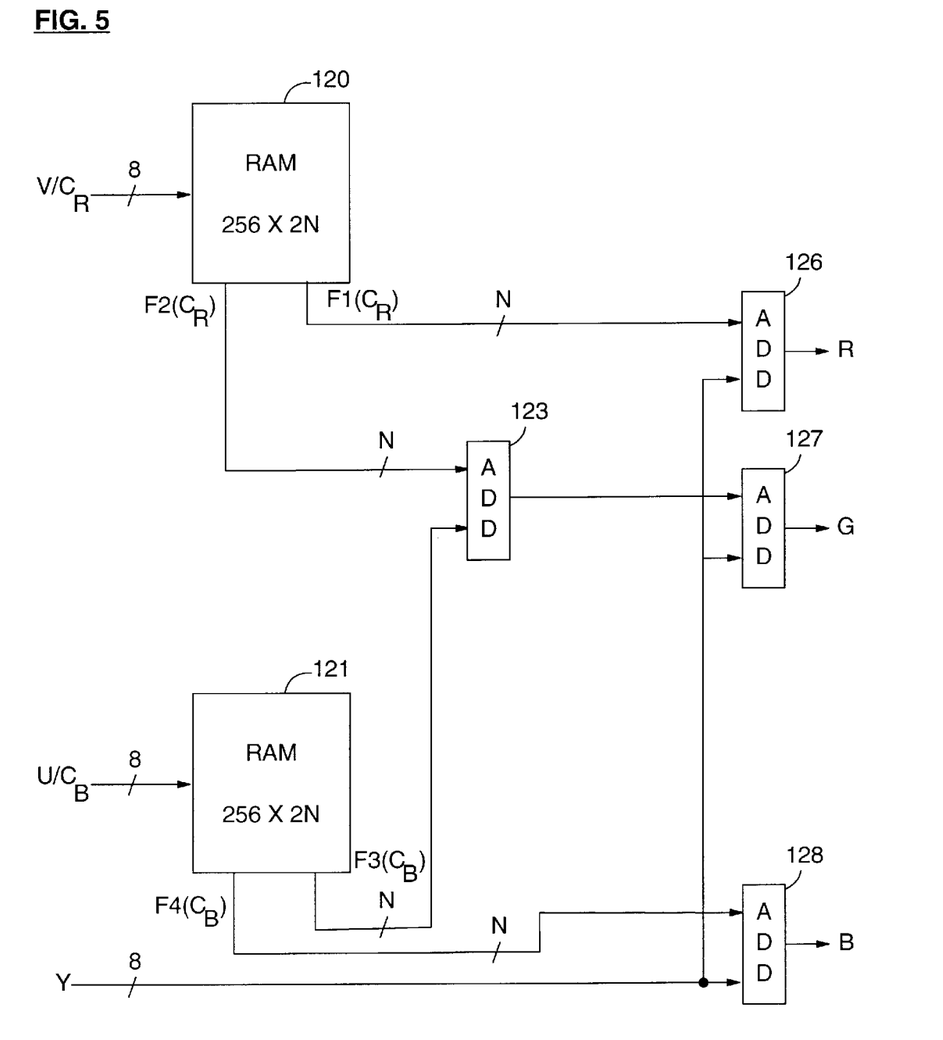
Figure 6:
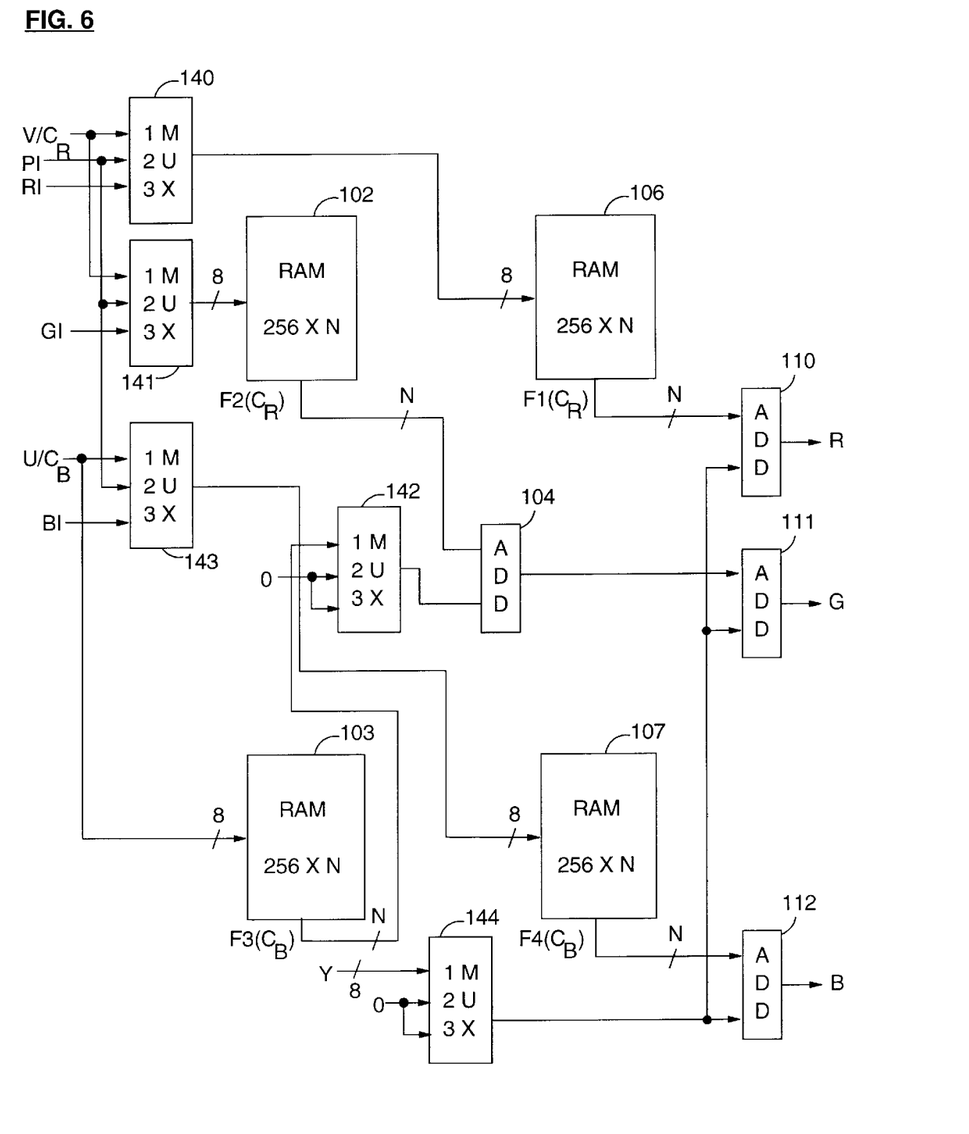
FIG. 6 schematically illustrates a variation of the second embodiment structure of FIG. 4, for allowing RAM units used in that structure to be shared for supporting a color palette emulation display mode.

FIGS. 2 and 3 illustrate a first embodiment of the invention, and FIGS. 4–6 illustrate various forms of a second embodiment. Each embodiment consists of one or more "small" RAM lookup table storage arrays (small, for instance, by comparison to the amount of storage capacity needed to store a "full page" source image), and an associated network of cascaded adders. The array(s) and associated adder network usually would be contained in or interface directly to a display adapter. In each embodiment, source UV components of YUV data are used to address data in a lookup table or tables stored in one or more small RAM storage arrays. The addressed data is read out to the associated adder network where it is additively combined and where respective Y components of the source data are added to produce R, G and B results representing an instantly displayable pixel.

3. First Embodiment Based on Shared Use of Conventional Palette RAM

In the first embodiment (FIGS. 2 and 3), serializer 30 is operated in one of three modes to convert source data into a succession of bit parallel units of predefined widths, and to present respective data units for processing in one of three display conversion circuit paths: a first path consisting of direct translating circuit 32 (receiving respective data units in 16 bit parallel sets), a second path consisting of palette RAM 34 (receiving respective data units in 8 bit parallel sets), or a third path comprising RAM 34 and back-end converter logic 36 (each receiving different respective data units in 8 bit parallel sets). Multiplexer switch 40, representing a three position switch, operates in modes conditioned by its "Display Mode Select" input to transfer output data from one of the circuit paths just mentioned (i.e. from circuit 32, output of RAM 34, or output of logic 36), to analog-to-digital (DAC) converting circuits 41–43 associated with a not-shown color monitor display 41–43. The output data transferred through multiplexer 40, representing RGB data defining a pixel displayable on the color monitor, are presented in 24-bit parallel units which are apportioned, in equal 8-bit parts, to each DAC. DAC's 41–43 convert respectively received code signals into analog signals representing relative intensities of red, green and blue components of a respective pixel.

The formats of data unit signals applied to and issuing from circuits 32, 34 and 36 are indicated in small numbers over slash lines intersecting the lines representing respective signal conduction paths. Thus, it is understood that circuits 32, 34 and 36 receive inputs having widths of 16 bits, 8 bits, and 8 bits, respectively; where inputs to circuit 32 directly denote color attributes, inputs to RAM 34 represent addresses, and inputs to logic 36 represent luminance components Y of YUV elements. Further, it is understood that each of the circuits 32, 34 and 36 produces 24 bit wide outputs.

The three switching positions of multiplexer 40 are associated with three distinct display modes: a direct mode, a palette mode, and a YUV-RGB convert mode. In direct mode, the multiplexer receives 24 bit wide inputs exclusively from circuit 32 and transfers them to DAC's 41–43. In palette mode, the multiplexer receives 24 bit wide inputs exclusively from RAM 34 and transfers them to DAC's 41–43. In YUV-RGB convert mode, the multiplexer receives 24-bit wide inputs exclusively from logic 36 and transfers them to DAC's 41–43.

In each of the foregoing modes, source data is supplied to serializer 30 in a form associated with the respective mode.

Thus, in direct mode, source data is furnished in a form in which successive 16 bit sets directly represent color attributes of successive pixels to be displayed. Circuit 32 appends 8 bits to each set of 16 bits it receives to form a 24 bit RGB pixel representation at its outputs.

In palette mode, source data is furnished in a form in which successive 8 bit terms represent palette index functions, each of which is useful to locate a corresponding 24-bit unit of RGB palette data stored in RAM 34. The latter unit is read out of RAM 34 and transferred through multiplexer 40 to form a corresponding pixel image. For this mode to be used, a special programmed table of palette data must be stored in RAM 34 (e.g. by an application or device driver program which initiates the palette mode).

In YUV-RGB mode, a different form of lookup table data is stored in RAM 34 (different from the data stored in palette mode); e.g. by operation of an application or device program which initiates this mode. In this mode, successive 16 bit sets of source data supplied to serializer 30 consist of an 8 bit subset that is applied to RAM 34, which represents a table lookup address, and another 8 bit subset that represents a Y (luminance) component of a YUV pixel representation.

The 8 bit subsets applied to RAM as successive table lookup addresses represent U and V components of a pair of consecutive YUV pixels in a source image that is to be converted. These functions are generated originally by a chrominance sub-sampling process discussed below. Data read out of RAM 34 in successive access cycles, at locations designated by addresses associated with U and V components of an associated pair of source image pixels, consist of 24 bit terms that are applied to logic 36. Each term represents a product of multiplication of the respective source pixel component (U or V) by a predetermined constant. Logic 36 variously sums fractional portions of the product associated with the U and V components of each pair of source image pixels, and adds the results to source data representing corresponding Y components of the respective pair, to form a 24-bit output function representing the RGB attributes of a corresponding pair of display pixels.

Logic 36 (details of which are described below in reference to FIG. 3) comprises a network of cascaded adders and latching buffers which perform a fixed part of the conversion. However, due to the variability of the data stored in RAM 34, the conversion transformation performed in combination by the RAM and logic 36 can be changed (e.g. programmably) to adjust to variations in source data, display parameters, etc. The complete YUV-RGB conversion transformation process performed by RAM 34 and logic 36 is defined by known conversion equations as follows (reference the Signetics Philips Handbook and article by A. C. Hung cited above):

$R = Y + K1(128 - C_r)$ $G = Y + K2(128 - C_r) + K3(128 - C_b)$ $B = Y + K4(128 - C_b)$ where: R, G and B represent the RGB components; Y represents the YUV luminance components; $C_r$ and $C_b$ respectively represent the V and U components of a YUV element; and Ki (i=1–4) are predetermined constants which (for simple decoding of the $YC_rC_b$ signals) have the following values:

K1=1.402 (decimal) or 1.01100110 ("bicimal" rounded to 9 places)

K2=0.7141 (decimal) or 0.101101110 (bicimal)
K3=0.3441 (decimal) or 0.010110000 (bicimal)
K4=1.772 (decimal) or 1.110001011 (bicimal)
By inspection, these constants can be re-expressed as:

$$K1 = A + (1/64)B$$

$$K2 = (1/2)A + (1/64)B$$

$$K3 = (1/4)A$$

$$K4 = B + (1/64)A$$

where A=1.011 (bicimal) and B=1.110 (bicimal)

With substitution of the re-expressed constants, the CCIR601 equations for R, G and B may be re-expressed as:

$$R = Y + A(128 - C_r) + (1/64)B(128 - C_r)$$

$$G = Y + (1/2)A(128 - C_r) + (1/64)B(128 - C_r) + (1/4)A(128 - C_b)$$

$$B = Y + B(128 - C_b) + (1/64)A(128 - C_b)$$

In more general terms, if the above multiplications by A and B are re-expressed using functions $F_A$ and $F_B$, respectively, the RGB equations become:

$$R = Y + F_A(C_r) + (1/64)F_B(C_r)$$

$$G = Y + (1/2)F_A(C_r) + (1/64)F_B(C_r) + (1/4)F_A(C_b)$$

$$B = Y + F_B(C_B) + (1/64)F_A(C_B)$$

YUV data can be stored in a number of different formats; the most common being YUV24, YUV16, and YUV8, where the final number indicates the number of bits per image element/pixel. Of these, the 24 bit form (YUV24) provides the highest possible encoding quality for natural images, but has the drawback of requiring more capacity in general purpose memory and video RAM to hold the data for any image. In natural images, it is found that luminance (brightness) varies spatially much more rapidly than chrominance (color). It is common therefore for imaging systems to sample chrominance components of an image less frequently than luminance components. This technique, termed "chrominance sub-sampling", is used in almost all television standards and is common in the related evolving field of MultiMedia. Chrominance sub-sampling has the advantage of reducing the amount of video memory required to hold a natural image, with little detriment to the image quality, since the sub-sampling technique tends to match the image properties.

With chrominance sub-sampling, the YUV16 format, which is the format upon which the circuit arrangement of FIGS. 2 and 3 is based (the second embodiment described later presents circuits for effectively accommodating the YUV24 format), requires 32 bits to define a pair of consecutive pixels. The YUV16 representation for a pair of consecutive pixels may be expressed as 8Y8U/8Y8V, where the first 16 bits consist of 8 bits of Y information and 8 bits of U information, and the next 16 bits consist of 8 Y bits and 8 V bits.

With this as background, and considering the earlier description of the YUV-RGB mode circuit paths in FIG. 3, it is understood that the source data applied to RAM 34 and logic 36 consists of YUV16 data, originated by chrominance sub-sampling, such that each unit of data representing a pair of consecutive pixels in the source image is applied to the RAM and logic in a pair of consecutive access cycles. In the first cycle, 8 bits of V ($C_r$) data are applied to the addressing input of RAM 34, while 8 bits of Y data are applied to logic 36 (these 16 bits together representing luminance of one pixel of the pair and part of the chrominance of both pixels of the same pair). In the next cycle, 8 bits of U data ($C_b$) are applied to RAM 34 while 8 bits Y data are applied to logic 36 (these 16 bits together defining luminance of the other pixel of the pair and the remainder of the chrominance of both pixels of the same pair).

When the $C_r$(V) and $C_b$(U) components are presented successively, as described above, then the YUV-RGB conversion need execute only two multiplications of these components by the functions $F_A$ and $F_B$ given above. After these multiplications, the remaining multiplications (by 1/64, 1/8, 1/4, 1/2) and additions of the luminance component Y, can be effected by simply bit shifting the results of the first multiplications and adding Y. Thus, the conversion process can be split into a first part performed by a table lookup in RAM 34 and a second part (bit shifting and Y additions) performed in logic 36.

Details of logic 36 are indicated in FIG. 3. Banks of parallel latches, denoted by LV, LU, LR, LG, LB, LY, etc., all contain edge triggered latches. PCLK is the pixel rate clock, and UCLK and VCLK are two anti-phase versions of the pixel rate clock divided by two. Path widths are indicated by numbers or equivalent labels in small print above slashmarks (/) intersecting lines representing paths.

Outputs of RAM 34 (18 of 24 bits) are transferred through-path 60 and split into two 9-bit paths 62 and 64, and applied to adders 66-68 in various combinations explained below. Signals transferred on paths 60 and 62 are respectively associated with multiplicative functions of $F_A$ and $F_B$. In alternate accesses, to RAM 34, signals applied to path 62 represent products of $F_A$ by chrominance factors $C_r$(V) and $C_b$(U), and signals applied to path 64 represent products of $F_B$ by the same chrominance factors.

Notations "MSi" (i=3,7,8) over lines extending to the right from paths 62 and 64 represent the number of "most significant" bits transferred on the respective extension path with an associated shift right. MS8 means that the 8 most significant bits (of the 9 bits applied to the respective vertical path 62 or 64) are transferred with a shift right by one bit place; which amounts to a division of the respective original term by 2. MS7 means that the 7 most significant of the 9 source bits are transferred right shifted two places, with 0's inserted in the vacated positions; which amounts to a division of the source term by 4. MS3 means that the 3 most significant bits of a 9 bit source term are shifted right 6 places and vacant positions are filled with 0's; amounting to a division of the source term by 64.

Adder 66 receives only functions of product terms in which $C_{r(V)}$ components are factors, and at VCLK time, result signals produced by adder 66 are latched in bank of latches 70 (LV1). Adder 66 receives fall 9-bit terms from path 62 and 1/64th of terms conveyed on path 64 (note "MS3" in the respective path). Thus, adder 66 produces a result representing 1/64th of $F_B(C_r) + F_A(C_r)$ (see last equation for R above).

Adder 67 also receives only function of product terms in which $C_r$ is a factor, and adder 68 receives only functions of product terms in which $C_b$ is a factor. Analyses similar to that above for adder 66, reveal that adder 67 produces results representing the expression: 1/64th of $F_B(C_r) + 1/2$ of $F_A(C_r)$ (see last equation for G above); and adder 68 produces results representing: 1/64th of $F_A(C_b) + F_B(C_b)$ (see last equation for B above).

Outputs of adder 67 are stored in latch bank 71 (LV2) at VCLK time, and outputs of adder 68 are stored in latch bank 72 (LU2) at UCLK time.

Another latch bank 73 (LU1) receives signals at UCLK time representing the function: ¼th of $F_A(C_b)$ (see last equation for B above).

Thus, it is understood that latch banks 70–73 receive information representing all but the Y terms in the last equations given above for R, G and B.

At UCLK time, data held in latches 70 is transferred to latches 76 labelled LR because of association with Red chrominance). Adder 77 receives and adds terms held in latches 71 and 73, and at UCLK time the result is stored in latches 78, labelled LG because of association with Green chrominance (see last equation for G above). Also, at UCLK time, data in latches 72 is transferred to latches 79, labelled LB for Blue association.

While the above operations are taking place, Y (luminance) components of respective pixels are shifted through the latch pipeline formed by successive latch banks 84–87 (latches LY1–LY4), by the pixel clock PCLK, and data held in latches 87 is applied to adders 90–92 which respectively receive second inputs from latches 76, 78 and 79. Thus, a Y term is added to functions received by latches 76, 78 and 79 at UCLK times, which at the time of such additions represent derived attributes of the source pixel associated with the respective Y term. This completes operations satisfying the last equations given above for R, G and B; so that each set of parallel outputs of adders 90–92 represents R, G and B attributes of a displayable pixel corresponding to a source YUV pixel associated with the data functions applied to paths 62 and 64 four pixel clock cycles earlier.

4. Second Embodiment Based on RAM Units Tailored to YUV-RGB Conversion

Various forms of a second embodiment of the invention are illustrated in FIGS. 4–6. In this embodiment, U and V data representing chrominance of individual pixels, in a source image encoded in YUV form, are applied in parallel to one or more pairs of RAM lookup tables. Data read out of the tables, representing products of multiplications of the respective components by predetermined constants, is applied in parallel to a respective adder network (sans latches, since the data of each RAM pair is read out in parallel).

The arrangement of FIG. 4 uses a first pair of RAM's 102 and 103, to supply data representing multiplication products to a first adder 104, which operates in parallel with a second pair of RAM's 106 and 107 to supply data to a last adder stage containing three adders 110–112. In each pair of RAM's one RAM is addressed by a V component of a source YUV pixel while the other RAM of the pair is addressed by a U component of the same pixel. The adders 110–112 add Y components of each source pixel to data received respectively from RAM 106, adder 104 and RAM 107, to produce output data respectively representing red (R), green (G) and blue (B) components of an instantly displayable pixel corresponding to the source pixel associated with the U and V data respectively used to address the RAM's, and the Y data input to the last adder stage.

Each RAM array holds 256 n-bit terms representing bicimal values determined as follows:

| RAM | Address | Data Value |
| --- | --- | --- |
| 106 | $C_r$ | F1 ($C_r$) = K1 (128 − $C_r$) |
| 102 | $C_r$ | F2 ($C_r$) = K2 (128 − $C_r$) |

-continued

| RAM | Address | Data Value |
| --- | --- | --- |
| 103 | $C_b$ | F3 ($C_b$) = K3 (128 − $C_b$) |
| 107 | $C_b$ | F4 ($C_b$) = K4 (128 − $C_b$) | where the constants Ki have n bit bicimal values corresponding to the following decimal values:

K1=1.4020
K2=0.7141
K3=0.3441
K4=1.7720 and consequently adders 110–112 produce respective R, G and B outputs:

R=Y+F1($C_r$)
G=Y+F2($C_r$)+F3 ($C_b$)
B=Y+F4($C_b$)

satisfying the R, G and B equations given earlier.

The variation of FIG. 5 performs the same conversions using two RAM arrays 120 and 121, and four adders 123, 126, 127, and 128. Adder 123 performs the same function as adder 104 (FIG. 4), and adders 126–128 perform the same functions as adders 110–112 (FIG. 4). Each RAM array holds 256 words/terms, each 2n bits wide; where each term represents two n-bit bicimal values. Thus, on each access, array 120 outputs values corresponding to F1($C_r$) and F2($C_r$) above, and array 121 outputs values corresponding to F3($C_b$) and F4($C_b$) above.

The variation of FIG. 6 contains the same configuration of RAM arrays and adders as FIG. 4, with the same numbering as respective elements in FIG. 4, but with the RAM array and adders useful in multiple modes including: a YUV-RGB conversion mode, a Palette Emulation mode, and a Gamma Correction mode. Prior to operation in each mode, data associated with the respective mode is written into each RAM array. "Three-position" multiplexer switches 140–144, located in the data flow paths of the RAM arrays and the Y source data used in YUV-RGB conversion, are set to positions associated with respective modes and used as follows.

In YUV-RGB mode: multiplexers 140 and 141 supply addressing inputs to RAM's 106 and 102 respectively which represent V/$C_r$ components of YUV pixels; RAM 103 receives addressing inputs corresponding to U/$C_b$ components of YUV pixels, and its output (representing functions F3 above) is transferred by multiplexer 142 to adder 104; multiplexer 143 supplies RAM 107 with addressing inputs representing U/$C_b$ components of source YUV pixels; and multiplexer 144 transfers source data representing Y components of respective YUV source image pixels to inputs of each of the adders 110–112. Thus, in this mode the RAM's adders operate to perform the YUV_RGB conversions explained above.

In Gamma Correction mode: multiplexors 140 and 141 respectively supply source data Ri and Gi (respectively representing red and green color components) as addressing inputs to RAM's 106 and 102 respectively, for reading out stored data (representing corresponding gamma corrected red and green components of a displayable RGB pixel) to adders 110 and 104 respectively; multiplexer 143 supplies source data Bi (representing a corresponding blue color component) as an addressing input to RAM 107 for reading out stored data representing a corresponding gamma corrected blue component of an RGB pixel to adder 112; and multiplexers 142 and 144 supply "0" inputs to second inputs of each of the adders. Thus, adder 110 outputs data representing a red component of a displayable pixel, adder 111 outputs a green component of the same pixel (received from adder 104), and adder 112 outputs a blue component of the same pixel.

In Palette Emulation mode: source data Pi is applied to addressing inputs of RAM's 106 and 102, via multiplexers 140 and 141 respectively, and to an addressing input of RAM 107 via multiplexer 143. This causes the RAM's to respectively output data representing red, green and blue components of a displayable pixel. The other multiplexers supply 0 inputs to second inputs of adders 104 and 110–112, so that adders 110–112 serve to output data representing the same pixel.

It should be understood that the primary purpose of the invention is to provide an efficient arrangement for converting YUV or YIQ source data into corresponding RGB data on the fly. Thus, it should be understood that the support for additional modes and functions provided by the variation in FIG. 6, and by the elements of the first embodiment which support the Palette and Direct modes of that embodiment, serve to enhance the basic format conversion functions of respective configurations; but that the basic format conversion functions would be effective and useful without these additional modes and functions.

Another point to note is that in lieu of the above RAM arrays other forms of storage arrays could be used to implement the subject technique of YUV-RGB conversion. For example, read only arrays (ROM's) could be used for such, although ROM's might be difficult to share for the palette lookup mode associated with several of the foregoing embodiments. Also, changing lookup table data could require replacement of arrays; but, alternatively, electronically programmable ROM arrays (EPROM's) could be used, to permit data variation, with a disadvantage of slower access times by comparison to equivalent ROM or RAM arrays.

We claim:

1. A color image display system comprising:
   a source of encoded data in a first format, said data representing elements of a color image; said first format characterized in that it is not directly displayable by said system;
   means responsive exclusively to data encoded in a second format different from said first format for displaying color images; said data in said second format comprising data representing discrete pixel elements of the displayed image; and
   format conversion means coupled between said source and said image displaying means for converting said source data to corresponding data in said second format in real time coordination with display generation operations of said image displaying means; said conversion means performing a process of generating sums of product terms wherein the product terms are determined by multiplying data components in said first format by predetermined constant functions which are subject to being varied to adjust for a variety of factors in the source data and the image displaying means, said conversion means comprising:
   at least one RAM storage array receiving data from said source as addressing inputs, each said at least one array containing a programmable lookup table for generating all of said product terms in said process; and
   dedicated logic means receiving data from said source and product term data from said at least one RAM storage array and forming sums of data received from said source and said at least one array to complete said conversion process.

2. A color image display system in accordance with claim 1 wherein:
   said first format is a YUV format and said second format is an RGB format.

3. A color image display system in accordance with claim 2 wherein said dedicated logic means includes a cascaded network of logical adders.

4. A color image display system in accordance with claim 3 wherein said source provides data representing discrete Y, U and V attributes of pixels of an image formed in said YUV format, and wherein said format conversion means comprises:
   at least one pair of RAM storage arrays receiving said data representing said U and v pixel attributes as addressing inputs, one array in each said at least one pair of arrays receiving only data representing U attributes as addressing inputs, and the other array in the respective at least one pair receiving only data representing V attributes as addressing inputs, each said array of each said at least one of arrays storing data representing multiplication products of respective addressing inputs and predetermined constants, said multiplication products being read out when the respective array is addressed by respective addressing inputs; and
   logic circuit means coupled to said source and outputs of each said at least one pair of RAM storage arrays for processing data read out of said arrays in response to said respective addressing inputs in combination with data supplied by said source that represents said Y attributes associated with respective said addressing inputs of said arrays to produce result signals representing R, G, and B attributes of displayable image pixels corresponding to the image pixels represented by said source data.

5. A color image display system in accordance with claim 2 wherein said format conversion means comprises:
   a palette storage RAM which can be used alternately to store data representing product terms of a YUV-RGB conversion process and as a source of directly displayable RGB color data for use in a data conversion process unrelated to YUV-RGB conversion.

6. A color image display system in accordance with claim 5 wherein said dedicated logic means in said format conversion means further comprises:
   logic circuit means receiving data from said source and said palette RAM and producing respective outputs associated with said YUV-RGB conversion process; said respective outputs directly representing pixel elements of an RGB format displayable image when data stored in said palette RAM represents said product terms of said YUV-RGB conversion process; and
   multiplexing means receiving inputs from said palette RAM and said logic circuit means for selectively applying data to said image displaying means from said palette RAM exclusively when data stored in said palette RAM directly represents RGB pixel elements, and from said dedicated logic circuit means exclusively when data stored in said palette RAM represents said product terms of said YUV-RGB conversion process.

7. A color image display system in accordance with claim 6 wherein:
   said first format is a YUV format consisting of data produced by chrominance sub-sampling, said data consisting of discrete components conjointly defining luminance and chrominance attributes of pairs of adjacent elements of an image represented by all of the data supplied by said source;

said data in said first format is used to successively access pairs of terms stored in adjacent locations in said palette RAM when the data stored in said palette RAM represents said product terms of a said YUV-RGB conversion process; and said logic circuit means is configured to logically process said pairs of adjacently located terms to produce respective pairs of result signals representing adjacent pixel elements of an image in RGB format corresponding to the image formed by said source data.

8. A circuit arrangement for converting data in a YUV format, representing a natural image, into displayable image data in an RGB format comprising:

RAM storage means containing one or more lookup tables of information representing products of U and V components of pixel elements in said natural image respectively multiplied by predetermined constants;

means for applying addressing data to said RAM storage means representing said U and V components of consecutive pixels in said natural image scanned in a predetermined raster pattern; and logic means responsive to information read out of said RAM storage means in response to said addressing data, and to data representing Y image components corresponding to respective said addressing data, for producing signals representing discrete R, G and B attributes of displayable pixels corresponding to said scanned natural image pixels.

9. A data converting circuit in accordance with claim 8 wherein said lookup tables contain data representing multiplication products of predetermined constants and all possible values of U and V components capable of forming said addressing data.

10. A data converting circuit in accordance with claim 9, wherein said lookup tables contain data representing product functions: $F_A(V)$, $F_B(V)$, $F_A(U)$, and $F_B(U)$; where U and V are chrominance components of YUV pixel representations, and $F_A$ and $F_B$ are predetermined constants.

11. A data converting circuit in accordance with claim 9 wherein:

said lookup tables are stored in a single RAM unit that is addressed in consecutive cycles by data representing U and V components of pairs of consecutively scanned pixels in a said natural image.

12. A data converting circuit in accordance with claim 11 wherein said logic means comprises:

a network of cascaded adders with intermediate banks of latches for adding data read out of said single RAM unit in response to said addressing data representing components of a pair of consecutively scanned pixels, said network producing result output signals representing components of pairs of consecutive pixels encoded in an RGB format, said result signals being instantly applicable to a conventional color monitor to produce a display image corresponding to said natural image.

13. A data converting circuit in accordance with claim 9 wherein said lookup tables are stored in one or more pairs of RAM storage arrays configured so that one array of each said pair contains product function data associated only with U components of said natural image and the other array of each pair contains product function data associated only with V components of said natural image.

14. A converting circuit in accordance with claim 13 having multiple modes of operation including a YUV-RGB converting mode, a palette emulation mode and a gamma correction mode; and wherein data stored in said pairs of RAM storage arrays is varied to conform to said modes; different first, second and third sets of data being written into said arrays when said converting circuit is respectively set to operate in said YUV-RGB converting mode, said palette emulation mode, and said gamma correction mode.

* * * * *